US012769184B2

(12) United States Patent
Mody et al.

(10) Patent No.: US 12,769,184 B2
(45) **Date of Patent: *Oct. 20, 2026**

(54) MULTI-DEPTH CARRIER CARD APPARATUS AND METHOD FOR INSTALLATION AND REMOVAL OF LENS PROTECTORS

(71) Applicant: Case-Mate, Inc., Atlanta, GA (US)

(72) Inventors: Saumil Chetan Mody, Atlanta, GA (US); Shengfei Chen, Shenzhen City (CN)

(73) Assignee: CASE-MATE, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/444,474

(22) Filed: Jan. 9, 2026

(65) Prior Publication Data

US 2026/0133472 A1 May 14, 2026

Related U.S. Application Data

(63) Continuation-in-part of application No. 18/525,732, filed on Nov. 30, 2023.

(Continued)

(51) Int. Cl.

| | |
|---|---|
| ***G03B 11/04*** | (2021.01) |
| ***G02B 7/00*** | (2021.01) |
| ***G02B 27/00*** | (2006.01) |

(52) U.S. Cl.

CPC ............ *G03B 11/045* (2013.01); *G02B 7/004* (2013.01); *G02B 27/0006* (2013.01); *G03B 2217/002* (2013.01)

(58) Field of Classification Search

CPC .. G03B 17/566; G03B 11/041; G03B 11/045; G03B 2217/002; G03B 30/00;

(Continued)

(56) References Cited

U.S. PATENT DOCUMENTS

| | | | |
|---|---|---|---|
| 2,291,821 | A | 8/1942 | McNabb |
| D827,408 | S | 9/2018 | Stefanczyk-Lacor |

(Continued)

FOREIGN PATENT DOCUMENTS

| | | |
|---|---|---|
| TW | 648689 U | 11/2023 |

OTHER PUBLICATIONS

WSKEN for Samsung Galaxy S25 Ultra Camera Lens Protector, on sale May 29, 2025 retrieved from <https://www.amazon.com/WSKEN-Samsung-Galaxy-S25-Ultra/dp/BODPZTV5TJ/ref=sr_1_1_sspa?adgrpid=186693455495&dib=eyJ2ljoiMSJ9.q3xfc TAGHmRF_WN_7dObXI-i-AAu8ANCnVKaMkDAY1xKe0k_C7MccviYwyVw03ntkZDcMyu85hWzScLbnLuPovQLeTuVUOpIE-.*

(Continued)

*Primary Examiner* — Christopher E Mahoney

(74) *Attorney, Agent, or Firm* — Perilla Knox & Hildebrandt LLP

(57) ABSTRACT

An apparatus for installation and removal of a plurality of lens protectors to and from a plurality of lenses includes a carrier configured to retain a plurality of lens protectors, where the plurality of lens protectors include one or more first lens protectors and one or more second lens protectors in delivery positions for installation onto a plurality of lenses of a device, and a removal tool including a portion of the carrier and configured for removal of the one or more first lens protectors or the one or more second lens protectors from one or more lenses of the plurality of lenses of the device. The one or more first lens protectors and the one or more second lens protectors are positioned in different chambers in the carrier.

19 Claims, 12 Drawing Sheets

Related U.S. Application Data

(60) Provisional application No. 63/917,561, filed on Nov. 14, 2025.

(58) Field of Classification Search
CPC .. H04N 23/55; H04M 1/0264; H04M 1/0203; G02B 13/0015; G02B 13/0055; G02B 5/00; G02B 27/0006; G02B 7/004; B65D 69/00; B25F 1/00
See application file for complete search history.

(56) References Cited

U.S. PATENT DOCUMENTS

| | | | |
|---|---|---|---|
| 2018/0106986 | A1 | 4/2018 | Xu |
| 2024/0406530 | A1 | 12/2024 | Lin |

OTHER PUBLICATIONS

[Item U continued] mXZeHn9vyjE8J7o1Y4B5fowEIRsMtFgstbwCP2PVmCff_9we0xHU8HuoEUv-2CmPUBFIhMoC-X2GrovqRBbmtVrPcKEjEugE46TaY_mnflP8ptlaNqO-WFKKLr4BZFFMvuTOO7RLo.bv0YIWecrQYp7xaLDw7BjM2mICQvUSlct2PptFr2L0k&dib_tag=se&hvadid=779569046310&hvdev=c&hvexpln=0&hvlocphy=9052971&hvnetw=g&hvocijid=14004551999040717916--&hvqmt=.*

[Item U further continued] e&hvrand=14004551999040717916&hvtargid=kwd-2389913900365&hydadcr=28355_14903734_2323763&keywords=s25%2Bultra%2Blens%2Bprotector&mcid=9955fbdd03993ec5aa1b19aa0df91056&qid=1774921623&sr=8-1-spons&sp_csd=d2lkZ2VOTmFtZT1zcF9hdGY&th=1>.*

IPhone 15 Series Optik Pro Lens Protector—Spigen.com Official Site—Spigen Inc., pp. 1-7.

Screen captures from You Tube video clip entitled “Spigen iPhone Camera Lens Screen Protector—GLAStR EZ Fit Optik Pro Explained!” 13 pages, uploaded on Nov. 19, 2023 by user “asm_sannu”. Retrieved from Internet: <https://www.youtube.com/watch?v=4b Lcm4k3 Djs>.

Strauss, Paul “Guardman Comb Multitool”, Jul. 10, 2017 [retrieved on Dec. 13, 2025] from internet <https://theawesomer.com/guardman-comb-multitool/434586/>.

Gsmarena “Samsung Galaxy A24 4G”, [retrieved on Dec. 12, 2025] retrieved from internet <https://www.gsmarena.com/samsung_galaxy_a24_ 4g-12176.php>.

Hoda Sapphire Lens Protector, YouTube video https://www.youtube.com/watch?v=m1EUkvM1Qc8, date unknown.

* cited by examiner

MULTI-DEPTH CARRIER CARD APPARATUS AND METHOD FOR INSTALLATION AND REMOVAL OF LENS PROTECTORS

CROSS-REFERENCE TO RELATED APPLICATIONS

This application is a continuation-in-part of, and claims priority to, U.S. patent application Ser. No. 18/525,732 filed Nov. 30, 2023, and claims priority to U.S. Provisional Patent Application Ser. No. 63/917,561 filed Nov. 14, 2025, both of which are hereby incorporated by reference herein in their entireties.

TECHNICAL FIELD

The present invention relates generally to the field of accessories for protection of components including optical lenses, for example camera lenses of electronic and/or optical devices and, and in more particular example embodiments to lens protectors for protecting camera lenses of mobile electronic devices and to apparatus and methods for installing and removing such lens protectors.

BACKGROUND

Electronic and optical devices such as mobile phones, tablet or laptop computers, cameras and magnification devices commonly include optical lenses and/or other components or features susceptible to scratching, chipping, or other damage. Replaceable or sacrificial protective elements such as lens protectors or lens covers may be utilized to protect such components or features from damage. For example, a ring-shaped lens protector or lens cover may be provided for installation over a camera lens of a mobile phone or tablet computer, with a clear protective cover panel configured to overlie and protect the external optical surface of the camera lens, and with an annular ring or collar configured to fit around the outer circumference of the lens and hold the protective cover panel in place.

Such covers may be retained in place over the lens by a friction fit and/or releasable adhesive, whereby the cover can be removed and replaced if scratched, chipped or otherwise damaged, without damage to the protected camera lens. It has been found that installation and removal of such lens covers or other protective elements can be difficult, tedious and time-consuming. Additionally, manual placement and attachment of the lens protectors can leave fingerprints or debris on the lens, the cover panel or between the protected lens and the lens protector, which may negatively affect optical performance of the camera or other device. Removal of such protective devices may also be difficult, sometimes requiring a tool, which a user may not have readily available. In some instances, lens protectors may be sold along with a separate plastic crowbar style removal tool, but such tools may be less effective than desired and prone to breakage or loss.

Accordingly, it can be seen that needs exist for improved protective devices such as lens protectors or covers, and to improved apparatus and methods for installation and removal of such protective devices. It is to the provision of improved protective devices such as lens protectors or covers, and to improved apparatus and methods for installation and removal of such protective devices meeting these and other needs that the present invention is primarily directed.

SUMMARY

In example embodiments, the present invention provides improved protective devices such as lens protectors or covers. In further example embodiments, the present invention provides improved apparatus and methods for installation and removal of such protective devices. Particular example embodiments include a carrier card configured to retain one or more lens protectors in position for placement and installation over an optical lens, and further including a removal tool feature on the carrier card.

In one aspect, the present invention relates to an apparatus for installation and removal of a lens protector to and from a lens. The apparatus preferably includes a carrier configured to retain at least one lens protector in a delivery position for installation of the lens protector onto a lens of a device. The apparatus preferably also includes a removal tool comprising a portion of the carrier and configured for removal of the at least one lens protector from the lens of the device.

In another aspect, the invention relates to an apparatus for installation and removal of a lens protector to and from a lens. The apparatus preferably includes a carrier having a substantially rigid body with a front face and a back face and defining a plurality of chambers formed therein. The apparatus preferably also includes a front film layer applied over the front face of the carrier, and a back film layer applied over the back face of the carrier and removable therefrom. The apparatus preferably also includes a plurality of lens protectors, each lens protector positioned in a corresponding one of the plurality of chambers and retained therein between the front film layer and the back film layer. The apparatus preferably also includes a removal tool comprising a protrusion extending from the carrier.

In still another aspect, the invention relates to a method of installation and removal of a lens protector to and from a lens of a device. The method preferably includes providing a lens protector installation and removal apparatus having a carrier body, a lens protector retained in detachable connection with the carrier body, and a removal tool comprising a portion of the carrier body. The lens protector is preferably configured for installation onto a lens of a device by placement of the carrier body with the lens protector aligned with the lens, engagement of the lens protector onto the lens, and detachment of the lens protector from the carrier body. The removal tool portion of the carrier body is preferably configured for engagement between the lens protector and the device to remove the lens protector from the lens.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1A:
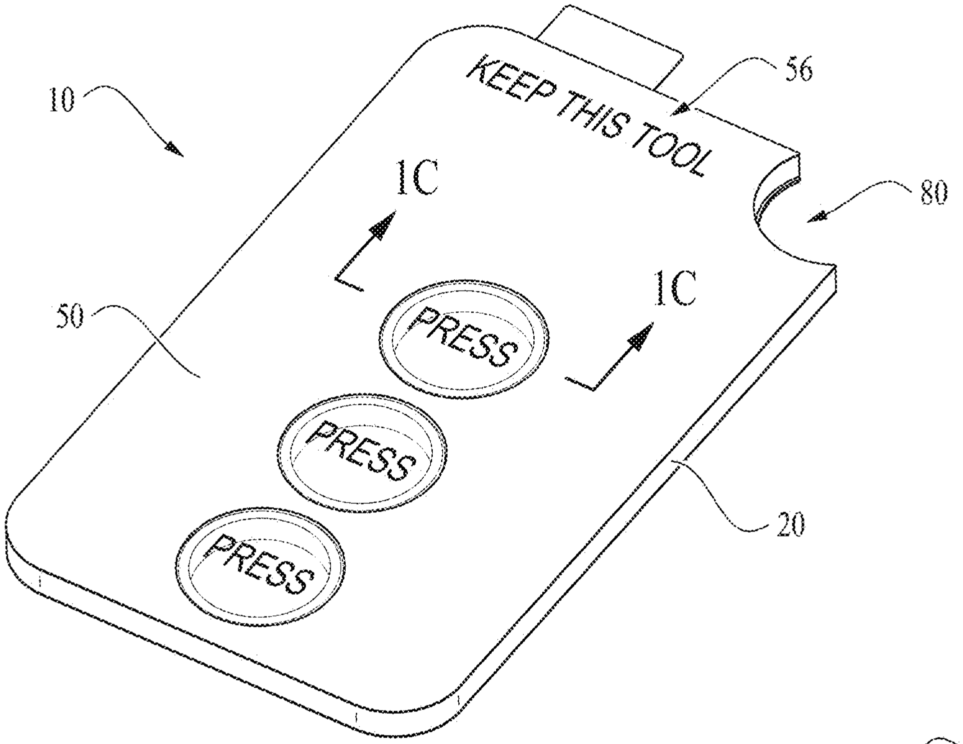
FIG. 1A is a first perspective view of a lens protector carrier, applicator and removal apparatus according to an example embodiment of the present invention.
Figure 1B:
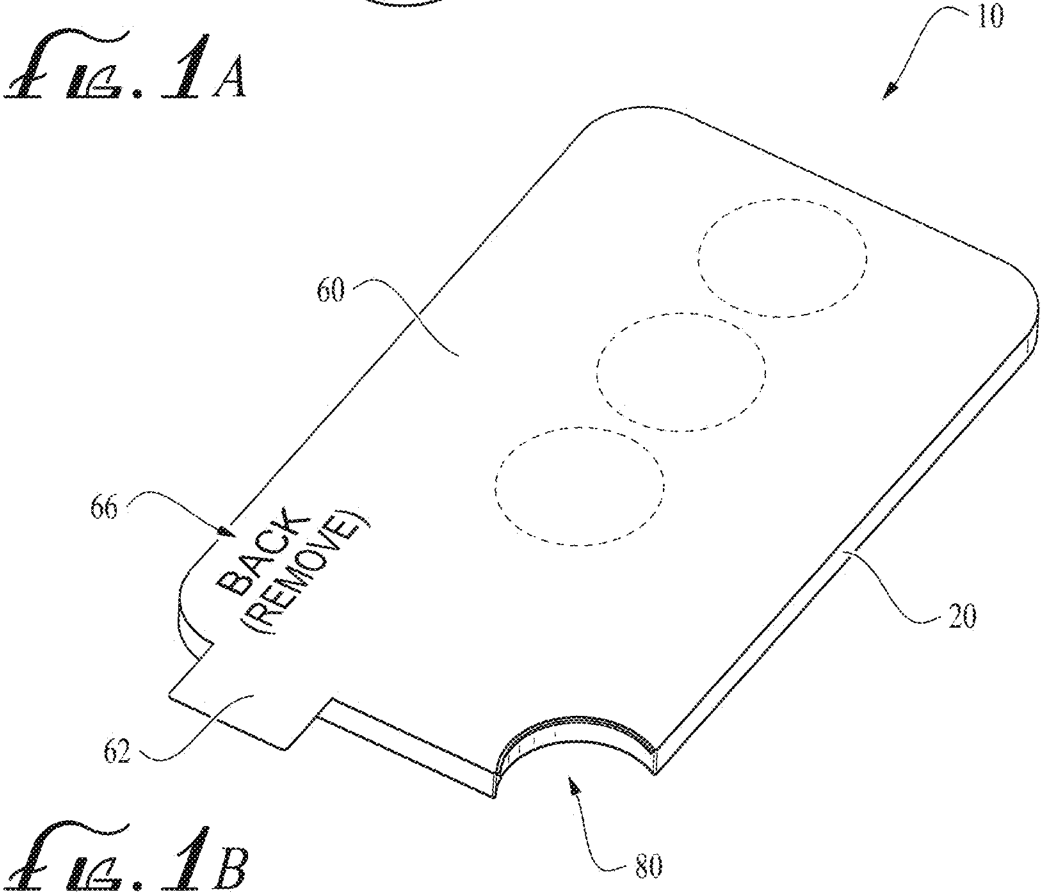
FIG. 1B is a second perspective view of the lens protector carrier, applicator and removal apparatus of FIG. 1, viewed from the opposite side.

With reference now to the drawing figures, wherein like reference numbers represent corresponding parts throughout the several views, FIG. 1 shows a lens protector carrier, applicator and removal apparatus 10 according to an example embodiment of the present invention. The apparatus 10 includes a carrier card body or panel 20 having one or more (at least one, and optionally a plurality of) openings or chambers 22 for releasably or removably retaining one or more (at least one, and optionally a plurality of) lens protectors or covers 30 therein for delivery and installation onto or over one or more lenses or other protected feature(s) of a cellphone, mobile phone, tablet or laptop computer, camera, magnification device, or other electronic and/or optical device. A front film layer or sheet 50 is applied over a first or front face of the carrier card body 20, including over the one or more chambers 22 and lenses retained therein; and a removable back film layer or sheet 60 is applied over an opposite second or back face of the carrier card body, also including over the one or more chambers and lenses retained therein. The front and back films 50, 60 adhere or attach to the carrier card 20 to cover and protect the lens protectors during storage and transit, and serve to retain the lens protectors in place in the chambers 22 against inadvertent removal until ready to be applied or installed onto or over the lens or other feature to be protected.

In example embodiments, the carrier card body or panel 20 is a generally rectangular planar body having a length, a width and a thickness configured or adapted to be operable with the size and configuration of the lens or other feature to be protected, or to an array of lenses or other features of the protected device. In example embodiments, the carrier card 20 comprises a substantially rigid panel formed of a material having sufficient stiffness and toughness to maintain the lens protector(s) in fixed position during installation, and to apply sufficient force for removal of the lens protectors as described herein. In example embodiments, the carrier card body or panel may comprise a polycarbonate (PC), acrylic (PMMA), and/or other material(s) of construction. In example embodiments, the carrier card body or panel 20 has three convexly curved, rounded or radiused corners, and a fourth corner defining a concavely or inwardly recessed cutout section 80 forming a lens removal tool. In alternate embodiments, two or more of the corners of the carrier card body 20 may comprise cutout sections forming lens removal tools of the same or differing configurations, and/or the cutout tool section may be located along a side or edge of the carrier card body between or away from the corners. In some example embodiments, the cutout section 80 is positioned on a corner generally opposite or a distance away from the openings or chambers 22 in the lengthwise dimension of the carrier card body 20 for improved stiffness and strength when the tool is applied for use in removing a lens cover.

In example embodiments, one or both of the front and back films 50, 60 are configured with a size and shape generally conforming to or matching the size and shape of the carrier card body 20. The front film 50 is attached or adhered to at least a portion of the front face of the carrier card body 20, for example by a low-tack releasable adhesive or electrostatic cling attachment. Alternatively, the front film 50 may be permanently attached to the body 20 by a permanent adhesive. In example embodiments, the adhesive may comprise an acrylic (PMMA) and/or other material(s). The front film 50 optionally includes one or more positional indicators 52 located over corresponding openings or chambers 22 of the carrier card body 20, such as for example, a circular outline generally corresponding to the circumference and position of the lens protectors 30, and/or "PRESS" or other instructional wording within the circular outline as shown in the depicted example embodiment of the drawing figures. In example embodiments, the front film 50 optionally also includes a cutout section 54 generally corresponding to the cutout section 80 of the carrier card body 20. The front film 50 may optionally also be labeled with one or more indicators or instructions for use 56, for example, to remind a user to "KEEP THIS TOOL TO HELP WITH REMOVAL IF NEEDED" or the like. The front film 50, or at least portions thereof in and around the positional indicators 52, is preferably deformable, resiliently flexible, and/or may be perforated or otherwise configured to stretch or tear upon application of a lens cover 30 to a lens or other protected feature during installation. In example embodiments, the front and/or back films may comprise a polyethylene terephthalate (PET), polycarbonate (PC), and/or other material(s) of construction.

In example embodiments, the back film 60 is also configured with a size and shape generally conforming to or matching the size and shape of the carrier card body 20. The back film 60 is attached or adhered to at least a portion of the back face of the carrier card body 20, for example by a low-tack releasable adhesive or electrostatic cling attachment. In example embodiments, the releasable adhesive may comprise a silicone (SI) and/or other material(s). The back film 60 optionally includes a removal tab or gripping portion 62 extending a distance outwardly beyond the periphery of the carrier card body 20 to assist a user in gripping and peeling the back film off of the carrier card body for application and installation of a lens cover 30 to a lens or other protected feature during installation. In example embodiments, the back film 60 optionally also includes a cutout section 64 generally corresponding to the cutout section 80 of the carrier card body 20. The back film 60 may optionally also be labeled with one or more indicators or instructions for use 66, for example, indicating "BACK—ADHESIVE SIDE—REMOVE" or the like. Alternatively or in addition, separate instructions for use may be packaged and provided with the apparatus 10. In example embodiments, the back film may comprise a polycarbonate (PC), acrylic (PMMA), and/or other material(s) of construction.

In example embodiments, the one or more lens protectors or covers 30 take the form of a ring-shaped lens protector or lens cover configured for installation over a camera lens of a mobile phone or other device, with a clear protective cover panel 32 configured to overlie and protect the external optical surface of the camera lens, and with an annular or ring or collar 34 configured to fit around the outer circumference of the lens and hold the protective cover panel in place. In example embodiments, the clear protective cover panel 32 comprises an optically transparent glass or polymeric material, and the annular ring or collar 34 comprises aluminum or other metal. The annular ring or collar 34 may be sized and shaped to have an inner diameter or dimension configured to conform to and fit over a corresponding outer diameter or dimension of a camera lens or other feature to be protected, for example with a close running fit, a push fit, or a light force fit to provide a removable friction fit engagement of the lens protector on the lens or other protected feature; and/or may use a releasable adhesive to provide secure but removable attachment of the lens protector on the lens or other protected feature. In the depicted example embodiment, three generally circular lens protectors or covers 30 are provided, arranged in a generally vertically or axially spaced array of openings or chambers 22 in the carrier card 20. In alternate embodiments, one, two, three, four, or more lens protectors or covers may be provided, arranged singly or in variously configured axial or offset array configurations or arrangements, optionally configured to generally match and align with an array configuration of the camera lenses or other protected features onto which the lens protectors are intended to be installed. In further example embodiments, the lens protectors or covers may be generally circular, generally rectangular, or otherwise shaped and configured.

Figure 1C:
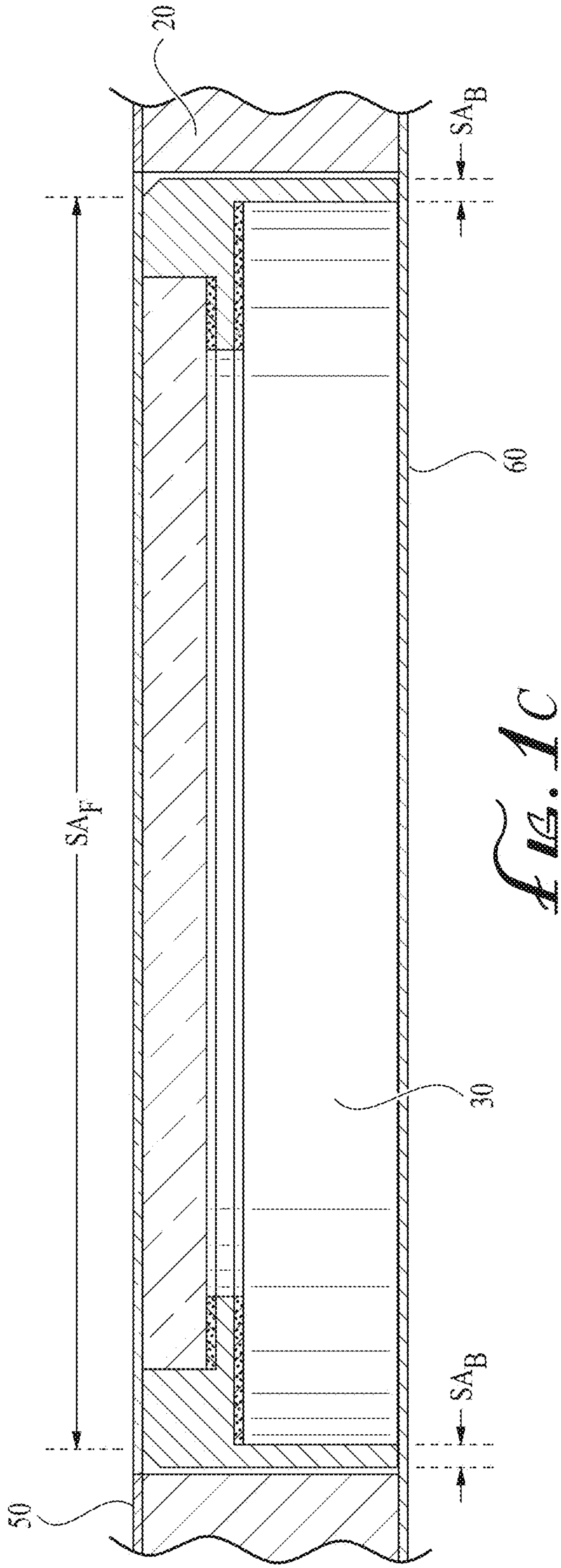
FIG. 1C is a detailed cross-sectional view of a lens carrier portion of the lens protector carrier, applicator and removal apparatus of FIG. 1 according to an example embodiment of the present invention.

As seen best with reference to FIG. 1C, a larger front bond surface area $SA_F$ of contact is formed between the front film 50 and the front surface of the lens protector 30 (which includes surface area of both the cover panel 32 and surface area of the annular ring 34) relative to a smaller back bond surface area $SA_B$ of contact between the back film 60 and the back surface of the lens protector 30 (which only includes surface area of the annular ring 34). In this manner, the lens protector(s) 30 will remain attached to the front film 50 when the back film is peeled away and removed during the installation process, due to the larger front bond surface area providing a stronger attachment to the lens protector than the smaller back bond surface area, thereby preventing premature dislodging of the lens protector from the chamber 22 of the carrier card 20 until the user is ready to apply and install the lens protector as described in further detail with reference to FIG. 4.

Figure 3:
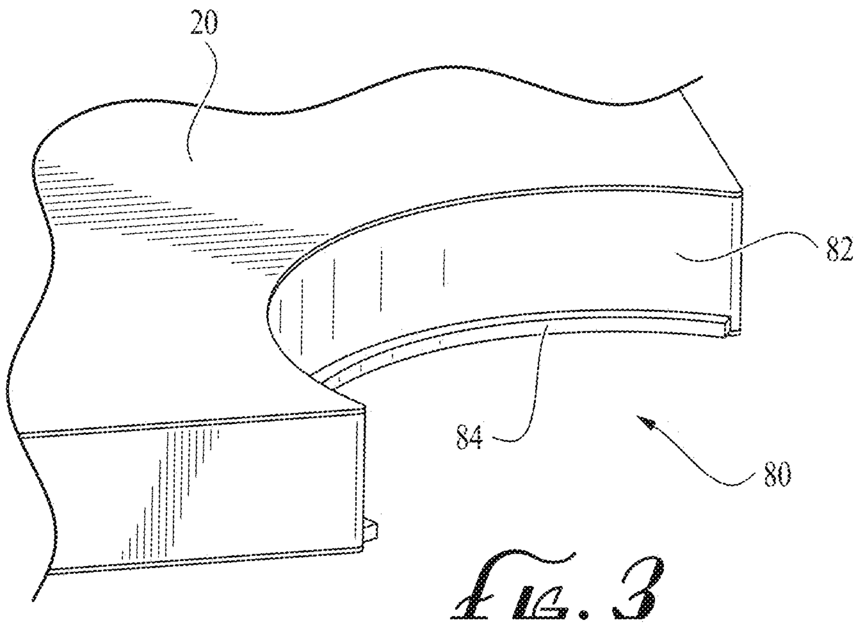
FIG. 3 is a detailed perspective view of the removal tool portion of the lens protector carrier, applicator and removal apparatus of FIG. 1.

FIG. 3 shows additional details of the recessed cutout section and lens removal tool portion 80 of the carrier card 20. A generally concave or inwardly recessed semicircular curved sidewall 82 extends transversely between the front and back faces of the carrier card along the recessed cutout section 80. A thin removal flange, fin or finger 84 extends a distance outwardly from the sidewall 82, for example forming a curved outwardly projecting member adapted and configured to fit under and around the annular ring 34 of a lens protector 30 and pry or push the lens protector to remove it from the lens as described in further detail with reference to FIG. 5. The removal flange 84 may project outwardly from the sidewall 82 at or adjacent the front or back face of the carrier card 20, or alternatively removal flanges may be provided at or adjacent both the front and back faces of the carrier card.

Figure 4A:
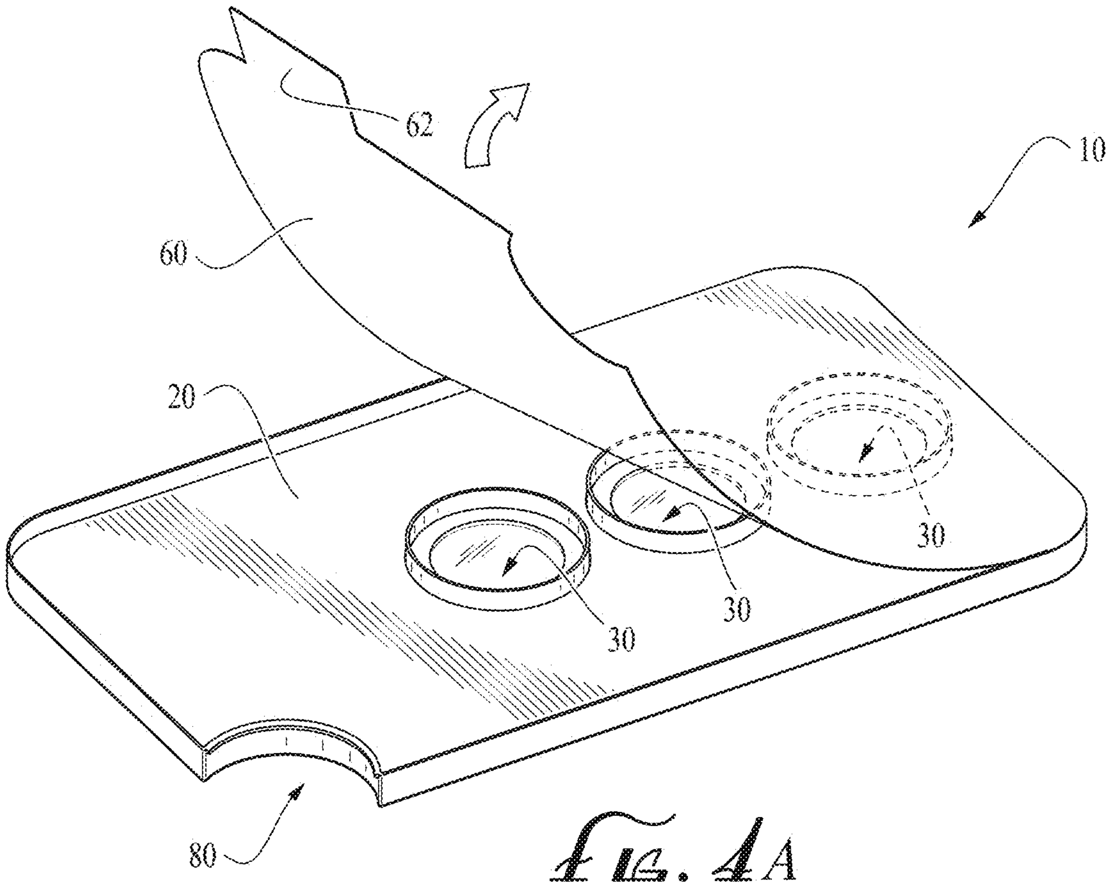
FIGS. 4A, 4B and 4C (collectively FIG. 4) show a sequence of operation of a method of installation of lens protectors according to an example embodiment of the present invention.
Figure 4B:
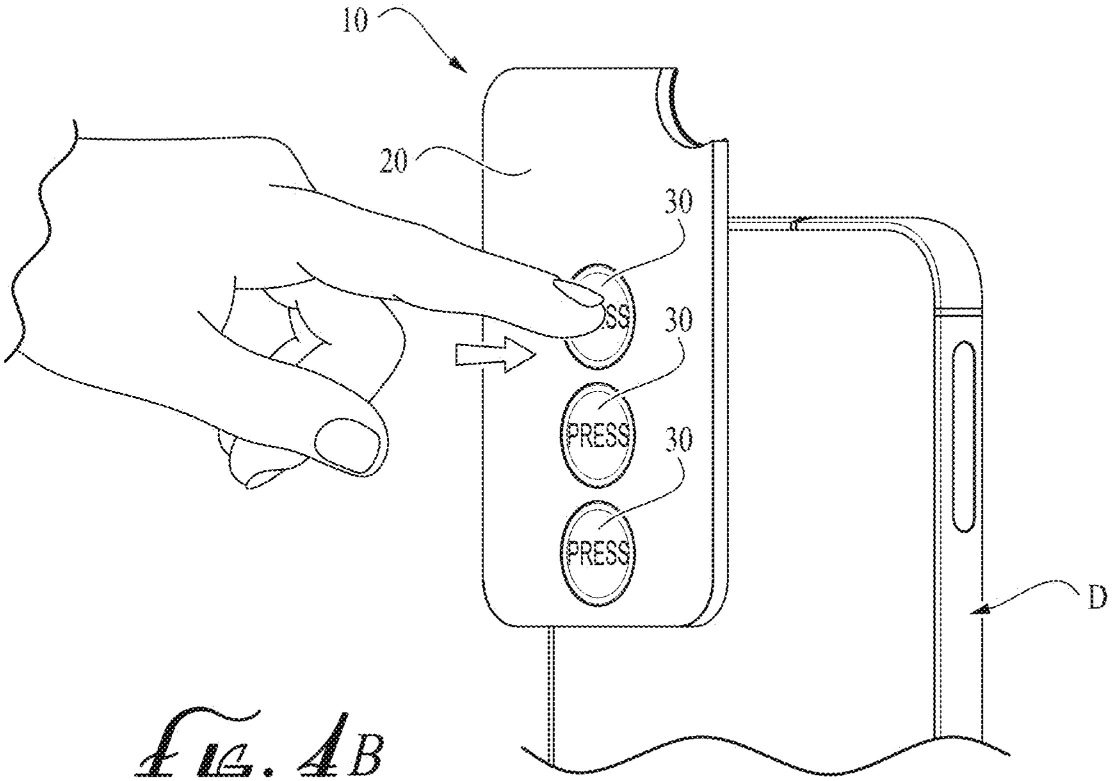
Figure 4C:
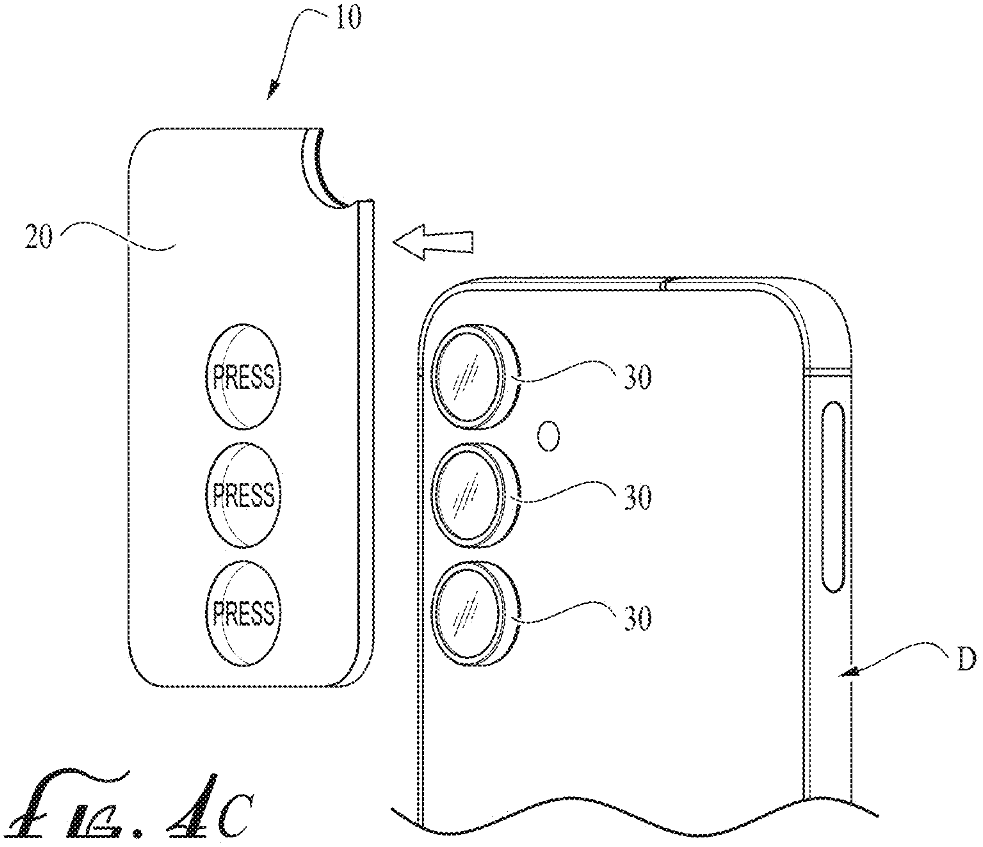

FIGS. 4A, 4B and 4C (collectively FIG. 4) show a sequence of operation of a method of installation of one or more lens protector(s) 30 onto one or more lens(es) L or other protected feature(s) of a device D such as a mobile phone, tablet computer, camera, or other electronic and/or handheld device, according to an example embodiment of the present invention. As shown in FIG. 4A, a user removes the back film 60 by gripping the removal tab 62 and peeling the back film away from and off of the carrier card 60 to expose the backs of the lens protector(s) 30. The larger surface area $SA_F$ of adhesive contact between the front film 50 and the front surface of the lens protector 30 relative to the smaller surface area $SA_B$ of contact between the back film 60 and the back surface of the lens protector allows the back film to be removed without displacing the lens protectors from the retention chambers 22 of the carrier card 20. Optionally, the user may clean the lens L as desired to remove fingerprints or dust prior to installation of the lens protector. Then as shown in FIG. 4B, the user positions the carrier card 20 with one or more lens protector(s) 30 aligned in position over one or more corresponding lens(es) L or other protected features of the device D. In example embodiments including a plurality of lens protectors in an array corresponding to an array of lenses, the plurality of lens protectors are aligned in arrayed position over the plurality of lenses, with each lens protector positioned over a respective corresponding lens. In alternate embodiments, a single lens protector 30 can be installed onto a single lens L, and/or multiple individual lens protectors can be separately installed onto multiple lenses of a device. The user then pushes each lens protector 30 onto it's corresponding lens L, for example with finger pressure as indicated by the direction arrow in FIG. 4B. The carrier card 20 is then removed by retracting it away from the device D, as shown in FIG. 4C, leaving the lens protectors 30 engaged in place in a protective configuration on the lenses L of the device. In example embodiments, the annular ring or collar 34 of the lens protector 30 fits sufficiently closely over and onto the lens L, such that a frictional engagement between the interior surface of the lens protector collar and the exterior surface of the lens is sufficient to retain the lens protector in place on the lens as the carrier card 20 is removed, and during extended use of the device D with the lens protector installed. In other embodiments, a releasable adhesive is optionally provided between the lens protector collar and the lens to retain the lens protector in the installed protective configuration during extended use. The frictional and/or adhesive engagement between the lens protector 30 and the lens L in the installed protective configuration is preferably sufficiently stronger than the bond between the lens protector and the front film 50 at the front surface area $SA_F$, so that removal of the carrier card 20 detaches the lens protector from the front film without causing disengagement or repositioning of the lens protector from the lens. Alternatively or additionally, the user figure pressure as indicated in the step of FIG. 4B assists in detachment of the lens protector 30 from the front film 50 and positioning and engagement of the lens protector onto the lens L. Once installed, the lens protector 30 protects the lens L from scratches, chipping or other damage during normal use of the device. In some example embodiments, the device D may have multiple (for example, three) lenses that are identical and equally spaced and/or symmetrically arranged, such that the consumer can apply or install the lens protectors in two or more mirrored or different orientations of the lens protector apparatus, for example top-to-bottom or bottom-to-top, or left-to-right or right-to-left. In other example embodiments, the lenses of the device may not be identical or equally spaced or symmetrical, and the protector apparatus may optionally have an alignment or indexing feature such as a directional arrow, text instructions, and/or other symbol or image, to assist the user in installation of the lens protectors in the correct orientation and ensure that the protectors are installed in a configuration or orientation that matches the device camera lens configuration or orientation.

Figure 5A:
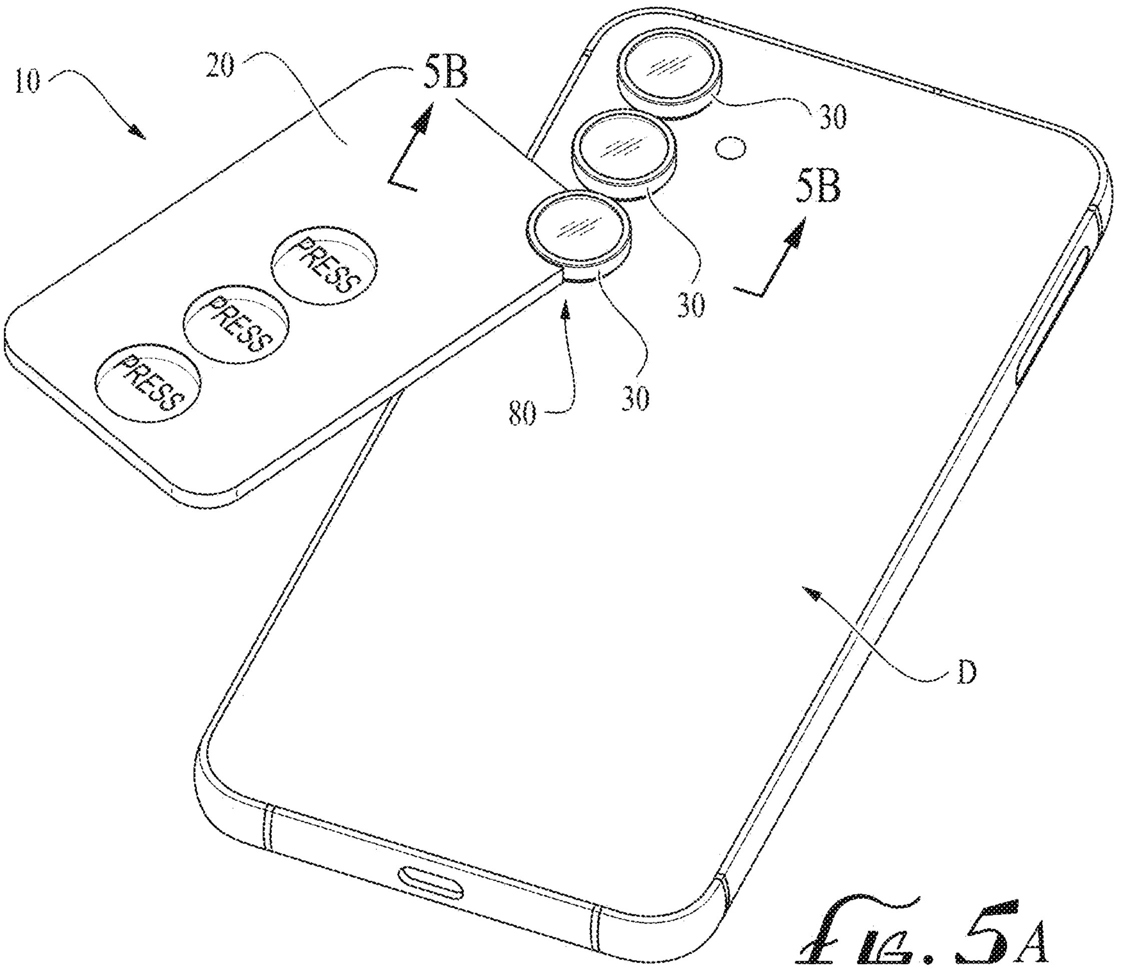
FIGS. 5A, 5B, 5C, 5D and 5E (collectively FIG. 5) show a sequence of operation of a method of removal of lens protectors according to an example embodiment of the present invention.
Figure 5B:
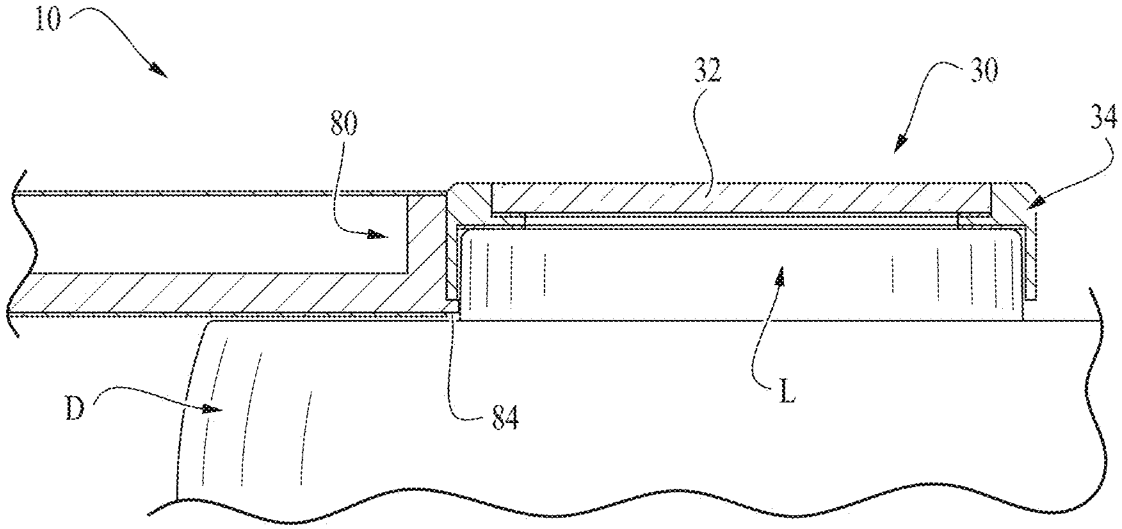
Figure 5C:
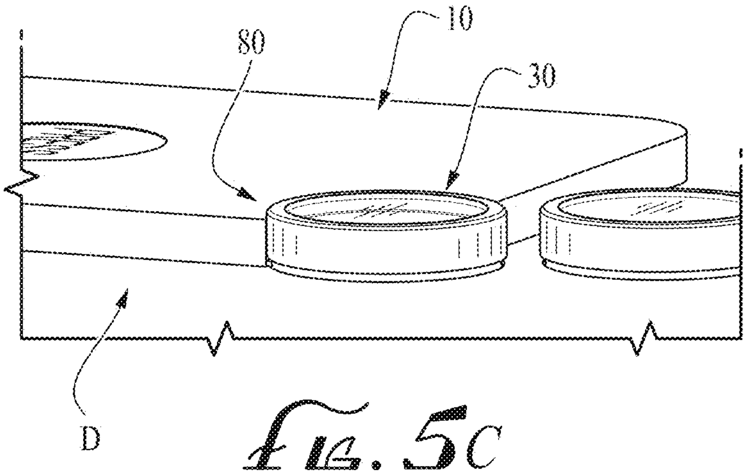
Figure 5D:
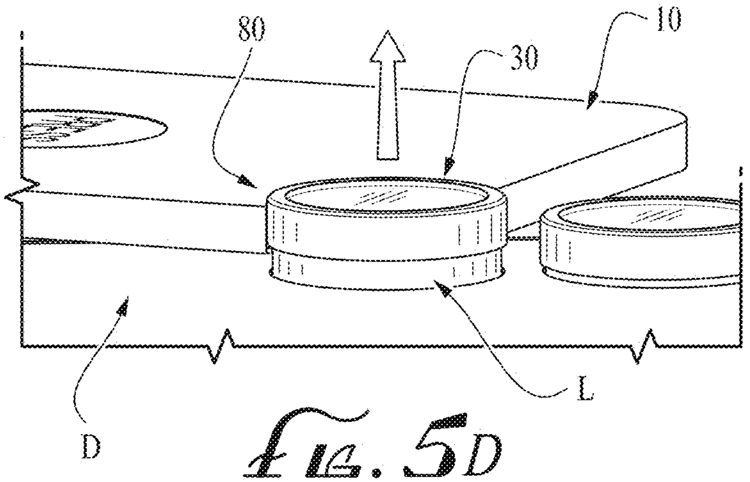
Figure 5E:
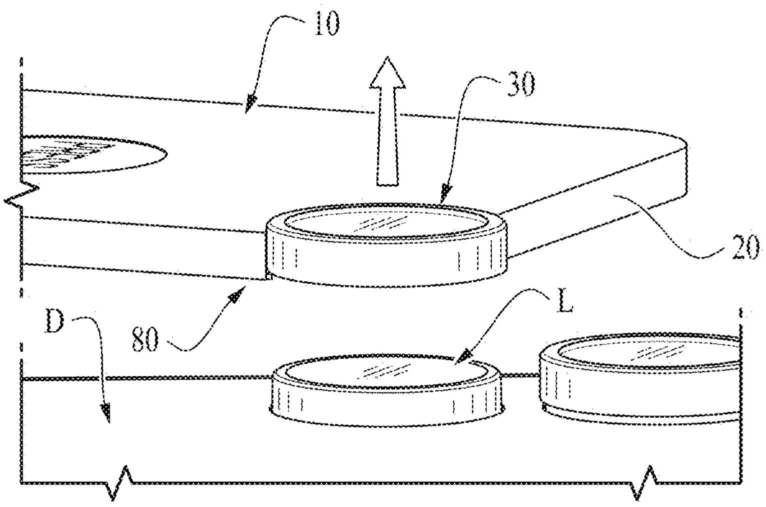

FIGS. 5A, 5B, 5C, 5D and 5E (collectively FIG. 5) show a sequence of operation of a method of removal of a used lens protector 30 from a lens L of a device D using a removal tool according to an example embodiment of the present invention. The lens protector removal tool preferably comprises a part of the same or a substantially similar or identical like apparatus used in the delivery and installation of the lens protector onto the lens, for example an integral portion of the carrier card 20, such that installation and removal elements of the apparatus are integral parts of a one-piece or unitary component. As shown in FIGS. 5A, 5B and 5C, the lens protector is removed from the lens L of the device D by positioning the carrier card 20 with its cutout section removal tool portion 80 engaged with the lens protector 30 to be removed. In example embodiments, the internal surface of the concave arcuate sidewall 82 is configured with a size and shape closely conforming to the corresponding convex external curvature of the sidewall of the annular ring or collar 34 of the lens protector 30. The removal flange 84 is inserted and engaged between the lens protector 30 and the lens L or other portion of the device D. In example embodiments, the depth of the collar 34 of the lens protector 30 is less than the depth of the lens L, such that a small gap or space is formed between the rim of the collar 34 of the installed lens protector 30 and the back face of the device D, into which the removal flange 84 can be received. The user then manually lifts and/or pries the carrier card 20 upwardly, as indicated in FIGS. 5D and 5E, to apply a lifting force or moment away from the device D to disengage and remove the lens protector 30 from the lens L of the device D. The length of the carrier card 20 provides leverage allowing the lens protector 30 to be readily removed with light to medium hand pressure, and the curvature of the removal tool portion 80 distributes the removal force over an extended peripheral area of the lens protector, thereby avoiding application of excess or concentrated forces that might damage the lens L or device D. The positioning of the removal tool portion 80 at a corner region of the carrier card allows the removal tool to have sufficient clearance for engagement with lens covers on lenses at any position within a lens array, for example at top, middle and bottom positions (or inner and outer positions) within a linearly spaced or otherwise configured lens array. The used lens protector may optionally be replaced with a new lens protector, installed in similar fashion as described above, and the used lens protector disposed of or recycled. In some example modes or methods of use, the lens protector removal tool used for removal of a used lens protector is part of the apparatus previously used for installation of that used lens protector. In other example modes or methods of use, the lens protector removal tool used for removal of a used lens protector is part of the apparatus that will be used for installation of a new lens protector.

Figure 6C:
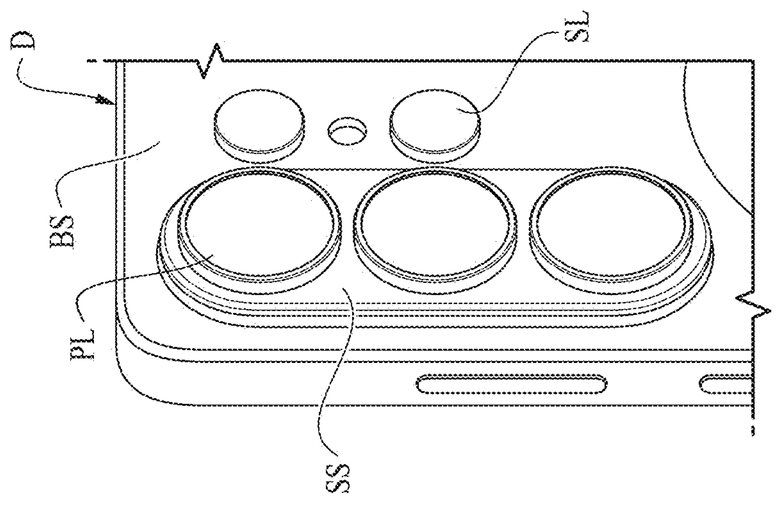
FIG. 6C depicts an example mobile device to which the apparatus can be applied for installation of lens protectors.
Figure 6B:
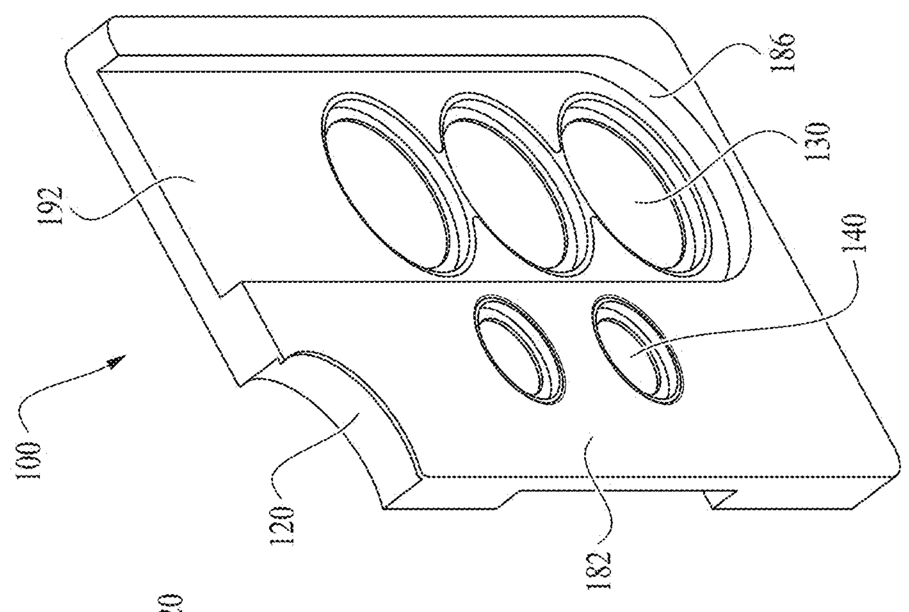
FIG. 6B depicts a back side of the apparatus shown in FIG. 6A according to one or more embodiments of the present disclosure.
Figure 6A:
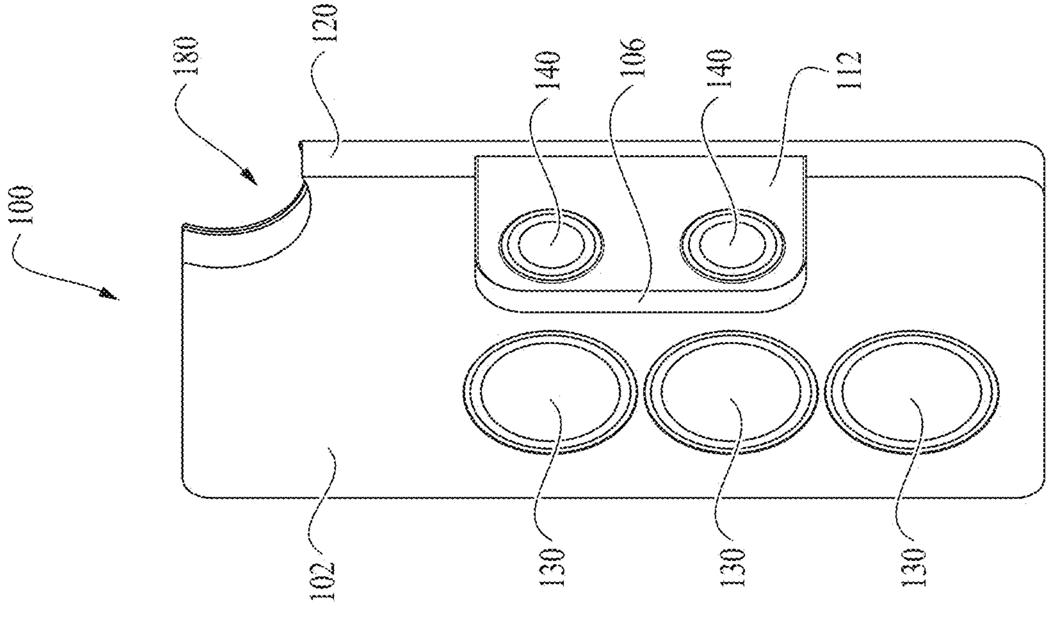
FIG. 6A depicts a front side of a lens protector carrier, applicator and removal apparatus according to one or more embodiments of the present disclosure.
Figure 7A:
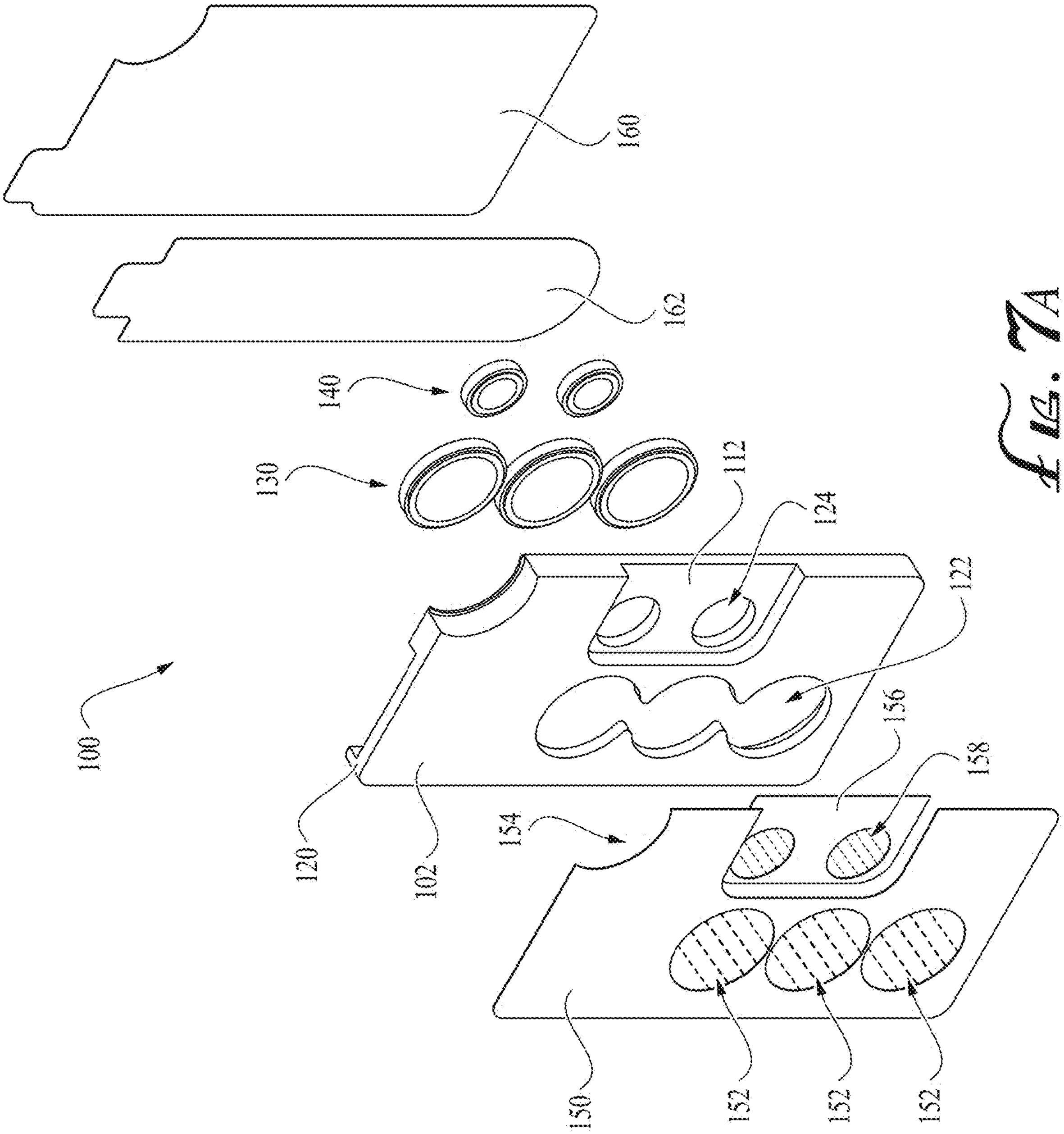
FIG. 7A depicts an exploded view of the apparatus shown in FIG. 6A from a front perspective view according to one or more embodiments of the present disclosure.
Figure 7C:
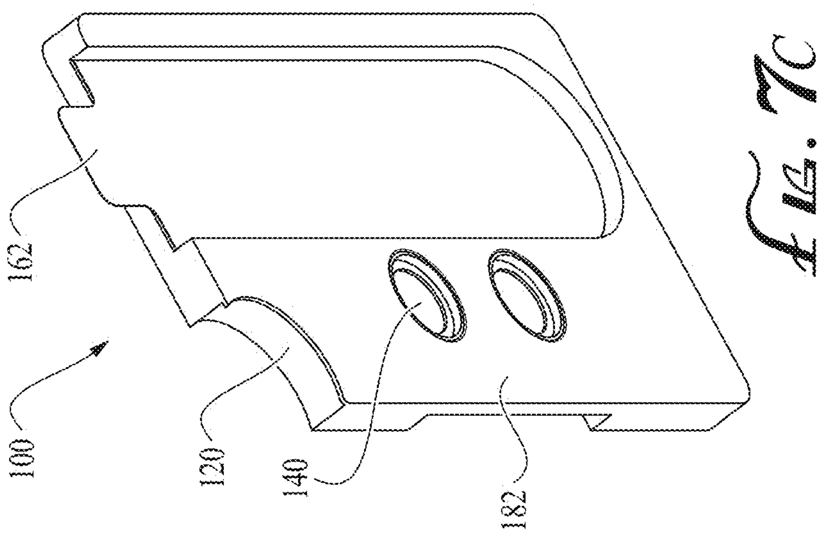
FIG. 7C depicts a back side of the apparatus shown in FIG. 6A with a center film applied according to one or more embodiments of the present disclosure.
Figure 7B:
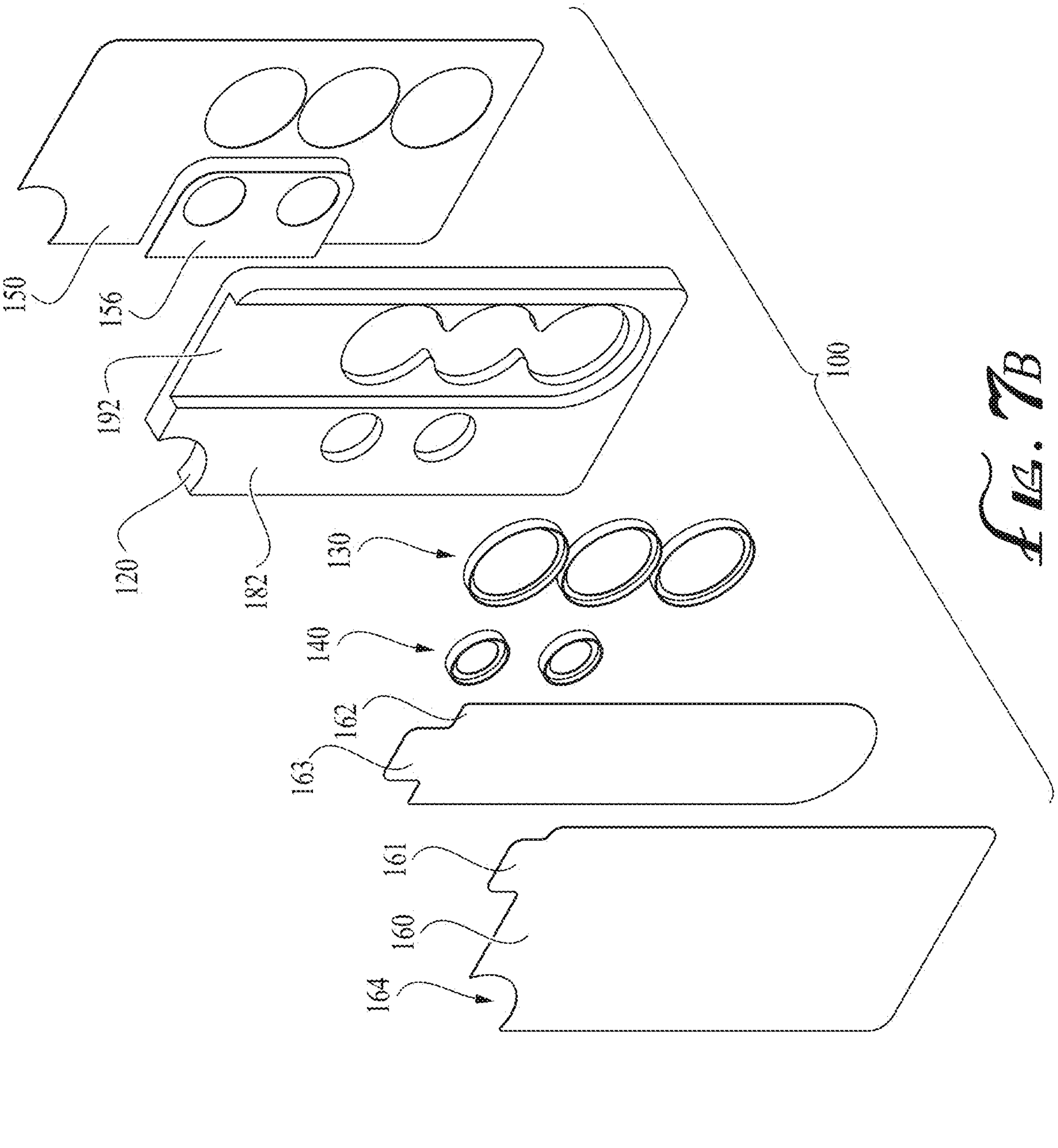
FIG. 7B depicts an exploded view of the apparatus shown in FIG. 6A from a rear perspective view according to one or more embodiments of the present disclosure.

FIG. 6A depicts a front side of a lens protector carrier, applicator and removal apparatus 100, according to another example embodiment of the present invention. FIG. 6B depicts a back side of the apparatus 100, and FIG. 6C depicts an example mobile device "D" to which the apparatus 100 can be applied to for installation of various lens protectors. FIG. 7A depicts an exploded view of the apparatus 100 from a front perspective view, FIG. 7B depicts an exploded view of the apparatus 100 from a rear perspective view, and FIG. 7C depicts a back side of the apparatus 100 with a center film 162 applied according to one or more embodiments of the present disclosure. FIGS. 6 and 7 are not exhaustively illustrated meaning that one or more components not illustrated may be included in some cases. Alternatively, one or more components may be omitted in practice although shown.

In contrast to the apparatus 10, the apparatus 100 is a lens protector carrier card with multi-depth installation features for installation onto lenses or sensors of a mobile device that may be protruding from different surfaces with differing depth levels. For example, with reference to FIG. 6C, the mobile device D includes a first or primary lens array "PL" (e.g., three camera lenses or sensors) protruding from a secondary surface "SS" and a second or secondary lens array "SL" (e.g., two camera lenses or sensors) protruding from a base surface "BS." Generally, the primary lens array protrudes further outwardly than the secondary lens array and thus, the two lens arrays are situated at the mobile device D at varying depths. The primary lens array PL of the mobile device D can include imaging devices such as various optical devices that capture visual information. The secondary lens array SL protruding from the base surface BS may also include various optical devices and sensors such as LiDAR depth mapping sensors, infrared cameras, and other types of sensing or imaging sensors. Cameras as referred to herein may include any optical imaging sensors.

The apparatus 100 includes a carrier card body 120 having a plurality of different openings or chambers 122 and 124 for releasably or removably retaining one or more (at least one, and optionally a plurality of) first lens protectors 130 and one or more (at least one, and optionally a plurality of) second lens protectors 140. The first lens protectors 130 can be configured to be retained in the chamber 122, and the second lens protectors 140 can be configured to be retained in the one or more chambers 124, for delivery and installation onto or over one or more lenses or other protected feature(s) of a cellphone, mobile phone, tablet or laptop computer, camera, magnification device, or other electronic and/or optical device, such as the lenses of the mobile device D. For example, the first lens protectors 130 can be configured to be applied over the primary lens array PL while the second lens protectors 140 can be configured to be applied over the secondary lens array SL.

Figure 2A:
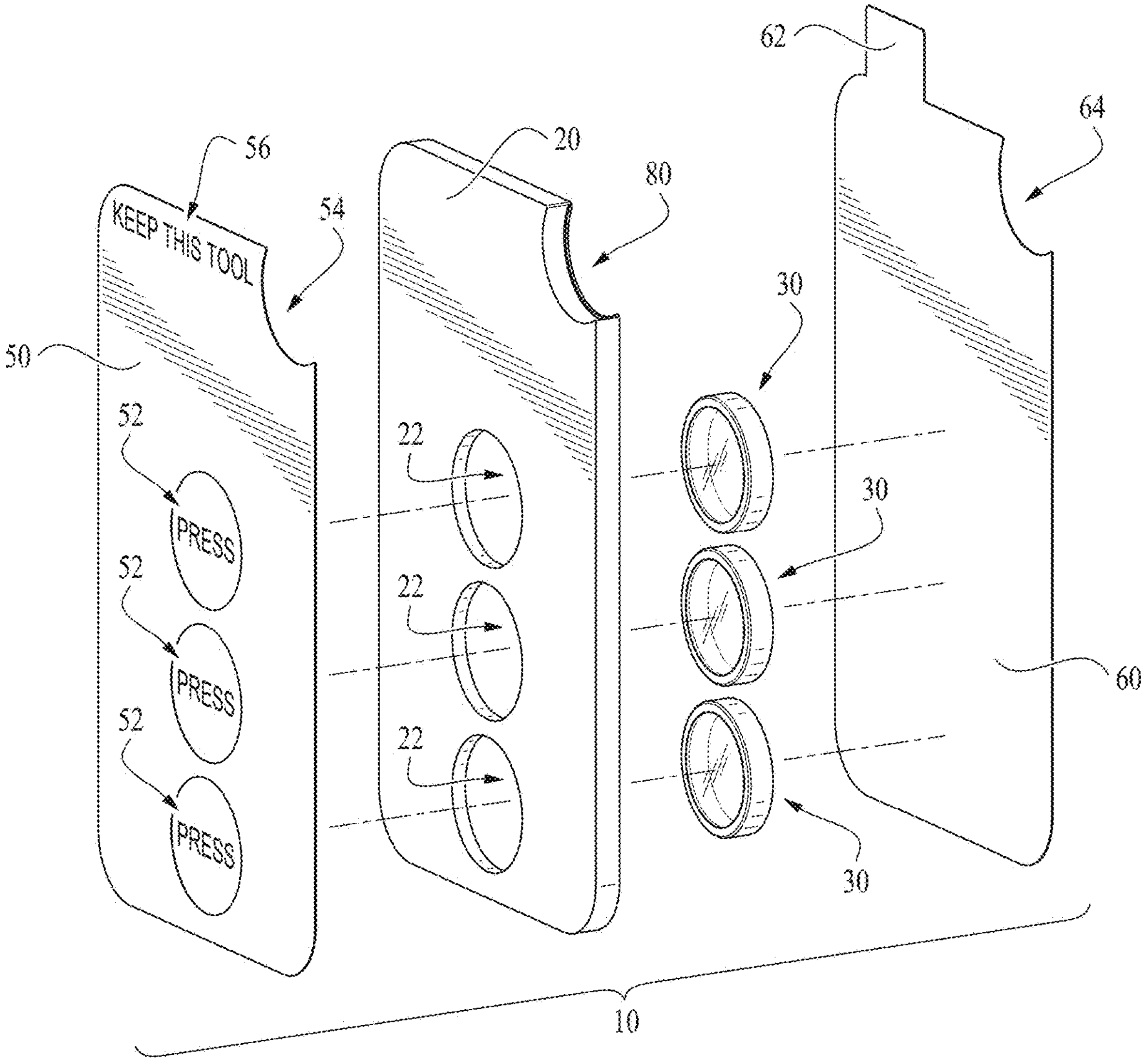
FIG. 2A is an assembly or exploded view showing components of the lens protector carrier, applicator and removal apparatus of FIG. 1 in greater detail.

The chamber 122 may be a continuous and uninterrupted chamber as shown in FIG. 7 or may include a plurality of openings that are separated from each other equidistantly, similar to as shown with respect to the apparatus 10 shown in FIG. 2A. The one or more chambers 124 may include one or more openings or chambers separated from each other equidistantly. Based on the number of lenses or sensors in a primary lens array or a secondary lens array to which the apparatus 100 is intended to be applied to, the number of openings or chambers in the chambers 122 and 124 may be increased or decreased. The one or more chambers 124 may be located in a first recessed section 112. For example, the first recessed section 112 may be recessed by an edge 106 from a front surface or face 102 of the carrier card body 120. The edge 106 may define a depth or thickness between the first recessed section 112 and the front face 102. The chamber 122 may be located in a second recessed section 192. For example, the second recessed section 192 may be recessed by an edge 186 from an opposite and back surface or face 182 of the carrier card body 120. The edge 186 may define a depth or thickness between the second recessed section 192 and the back face 182.

A front film layer or sheet 150 is applied over the front face 102 of the carrier card body 120, including over the chamber 122 and the lens protectors 130 retained therein. A secondary film layer or sheet 156 is applied over the first recessed section 112, including over the one or more chambers 124 and the lens protectors 140 retained therein. A removable back film layer or sheet 160 is applied over the opposite second or back face 182 of the carrier card body 120, also including over the chambers 122 and 124 and the lens protectors 130 and 140 retained therein. A center film layer or sheet 162 is applied over the second recessed section 192 (see FIG. 7B) and between the front film layer 150 and the back film layer 160. The front, secondary, back, and center films 150, 156, 160, and 162 adhere or attach to the carrier card 120 to cover and protect the lens protectors 130 and 140 during storage and transit, and serve to retain the lens protectors 130 and 140 in place in the chambers 122 and 124 against inadvertent removal until ready to be applied or installed onto or over the lens or other feature to be protected.

In example embodiments, the carrier card body or panel 120 is a generally rectangular planar body having a length, a width and a thickness configured or adapted to be operable with the size and configuration of the lens or other feature to be protected, or to an array of lenses or other features of the protected device. In example embodiments, the carrier card 120 comprises a substantially rigid panel formed of a material having sufficient stiffness and toughness to maintain the lens protector(s) in fixed position during installation, and to apply sufficient force for removal of the lens protectors as described herein. In example embodiments, the carrier card body or panel 120 may comprise a polycarbonate (PC), acrylic (PMMA), and/or other material(s) of construction. In example embodiments, the carrier card body or panel 120 may have three convexly curved, rounded or radiused corners, and a fourth corner defining a concavely or inwardly recessed cutout section 180 forming a lens removal tool. In alternate embodiments, two or more of the corners of the carrier card body 120 may comprise cutout sections forming lens removal tools of the same or differing configurations, and/or the cutout tool section may be located along a side or edge of the carrier card body between or away from the corners. For example, a first cutout section forming a first lens removal tool having a larger circumferential dimension or radius of curvature may be provided at one corner or side of the carrier card body 120 for removal of a larger sized first lens protector, and a second cutout section forming a second lens removal tool having a smaller circumferential dimension or radius of curvature may be provided at another corner or side of the carrier card body 120 for removal of a smaller sized second lens protector. In some example embodiments, the cutout section 180 is positioned on a corner generally opposite or a distance away from the openings or chambers 122 and 124 in the lengthwise dimension of the carrier card body 120 for improved stiffness and strength when the apparatus 100 is applied for use in removing a lens protector. In some other example embodiments, the cutout section of the lens removal tool 180 spans a circumferential arc corresponding to less than one-half of the circumference or diameter of the lens cover to be removed by the lens removal tool, such that the lens removal tool engages with less than one-half of the circumference or diameter of the lens cover when engaged for removal of the lens cover.

In example embodiments, one or both of the front and back films 150, 160 are configured with a size and shape generally conforming to or matching the size and shape of the carrier card body 120. The front film 150 and the secondary film 156 are attached or adhered to at least a portion of the front face 102 and the first recessed section 112, respectively, of the carrier card body 120, for example by a low-tack releasable adhesive or electrostatic cling attachment. Alternatively, the front film 150 and the secondary film 156 may be permanently attached to the front face 102 and the first recessed section 112, respectively, by a permanent adhesive. In example embodiments, the adhesive may comprise an acrylic (PMMA) and/or other material (s).

The front film 150 and the secondary film 156 optionally include one or more positional indicators 152 and 158, respectively, located over corresponding openings or chambers 122 and 124 of the carrier card body 120, such as for example, a circular outline generally corresponding to the circumference and position of the lens protectors 130 and 140. Although not shown "PRESS" or other instructional wording may be present within the positional indicators 152 and 158, similar to those of the positional indicators 52 (FIG. 2A). In example embodiments, the front film 150 optionally also includes a cutout section 154 generally corresponding to the cutout section 180 of the carrier card body 120. The front film 150 may optionally also be labeled with one or more indicators or instructions for use, for example, to remind a user to "KEEP THIS TOOL TO HELP WITH REMOVAL IF NEEDED" (not shown) or the like, similar to that shown for the apparatus 10 shown in FIG. 1A. The front film 150 and the secondary film 156, or at least portions thereof in and around the positional indicators 152 and 158, are preferably deformable, resiliently flexible, and/or may be perforated or otherwise configured to stretch or tear upon application of the lens protectors 130 and 140 to lenses or other protected feature during installation. In example embodiments, the front, secondary, back, and center films 150, 156, 160, and 162 may comprise a polyethylene terephthalate (PET), polycarbonate (PC), and/or other material(s) of construction.

In example embodiments, the back film 160 is also configured with a size and shape generally conforming to or matching the size and shape of the carrier card body 120. The back film 160 is attached or adhered to at least a portion of the back face 182 of the carrier card body 120, for example by a low-tack releasable adhesive or electrostatic cling attachment. In example embodiments, the releasable adhesive may comprise a silicone (SI) and/or other material(s). The back film 160 optionally includes a removal tab or gripping portion 161 extending a distance outwardly beyond the periphery of the carrier card body 120 to assist a user in gripping and peeling the back film 160 off of the carrier card body 120 for application and installation of the lens protectors 130 and 140 to lenses or other protected feature during installation. In example embodiments, the back film 160 optionally also includes a cutout section 164 generally corresponding to the cutout section 180 of the carrier card body 120. The back film 160 may optionally also be labeled with one or more indicators or instructions for use, for example, indicating "BACK—ADHESIVE SIDE—REMOVE" (not shown) or the like, similar to that shown for the apparatus 10 shown in FIG. 1B. Alternatively or in addition, separate instructions for use may be packaged and provided with the apparatus 100. In example embodiments, the back film 160 may comprise a polycarbonate (PC), acrylic (PMMA), and/or other material(s) of construction.

Figure 2B:
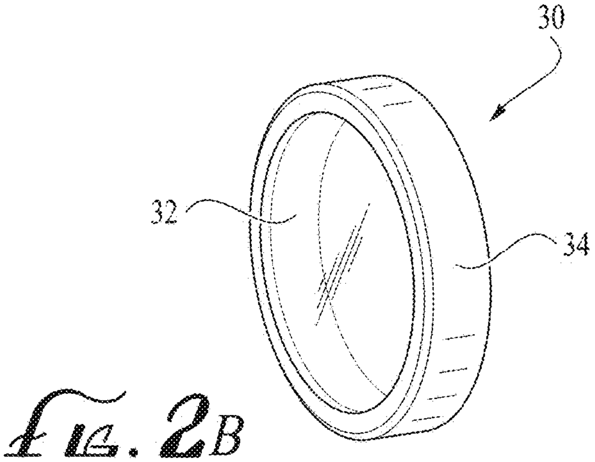
FIG. 2B is a detailed view of a lens protector element of the apparatus of FIG. 1 according to an example embodiment.

In example embodiments, the one or more lens protectors or covers 130 and 140 take the form of a ring-shaped lens protector or lens cover configured for installation over a camera lens or sensor of a mobile phone or other device (e.g., the primary lens array PL and the secondary lens array SL of the mobile device D shown in FIG. 6C). In this respect, the lens protectors 130 and 140 are similar to the lens protectors 30 shown in FIG. 2B, and the description of the lens protectors 30 shown in FIG. 2B is applicable to the lens protectors 130 and 140. However, the size of individual lens protectors in the lens protectors 130 may be different from the size of individual lens protectors in the lens protectors 140. For example, the size of individual lens protectors in the lens protectors 130 may be larger than the size of individual lens protectors in the lens protectors 140, or vice versa.

A larger front bond surface area $SA_F$ of contact is formed between the front film 150 and the front surface of the lens protectors 130 (which includes surface area of both the corresponding cover panel and surface area of the annular ring) relative to a smaller back bond surface area $SA_B$ of contact between the center film 162 and the back surface of the lens protectors 130 (which only includes surface area of the corresponding annular ring). In this manner, the lens protectors 130 will remain attached to the front film 150 when the center film 162 is peeled away and removed during the installation process, due to the larger front bond surface area providing a stronger attachment to the lens protector than the smaller back bond surface area, thereby preventing premature dislodging of the lens protectors 130 from the chamber 122 of the carrier card 120 until the user is ready to apply and install the lens protectors 130.

A larger front bond surface area $SA_F$ of contact is formed between the secondary film 156 and the front surface of the lens protectors 140 (which includes surface area of both the corresponding cover panel and surface area of the annular ring) relative to a smaller back bond surface area $SA_B$ of contact between the back film 160 and the back surface of the lens protectors 140 (which only includes surface area of the corresponding annular ring). In this manner, the lens protectors 140 will remain attached to the secondary film 156 when the back film 160 is peeled away and removed during the installation process, due to the larger front bond surface area providing a stronger attachment to the lens protector than the smaller back bond surface area, thereby preventing premature dislodging of the lens protectors 140 from the chambers 124 of the carrier card 120 until the user is ready to apply and install the lens protectors 140.

Additional details of the recessed cutout section and lens removal tool portion 180 of the carrier card 120 can be found with reference to the recessed cutout section 80 for the apparatus 10 shown in FIG. 3. For example, the recessed cutout section 180 is similar to the recessed cutout section 80, and the description for the recessed cutout section 80 is applicable to the recessed cutout section 180. Further a removal sequence using the recessed cutout section 180 of removal of a used lens protector 130 and/or 140 from a lens of the primary lens array PL and the secondary lens array SL of the device D is similar to the removal sequence of a used lens protector 30 from a lens L of a device D, described with respect to FIGS. 5A-5E.

Figure 8B:
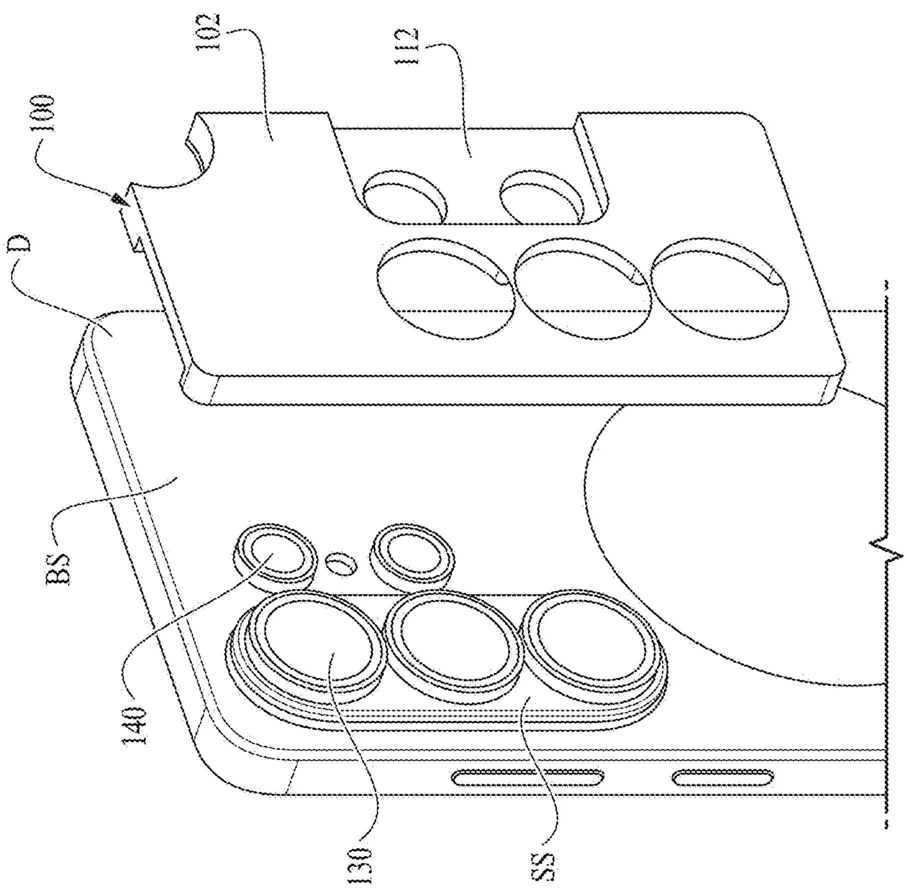
FIGS. 8A and 8B depict an example installation sequence of the apparatus shown in FIG. 6A over a primary lens array PL and a secondary lens array SL of a mobile device "D" according to one or more embodiments of the present disclosure.
Figure 8A:
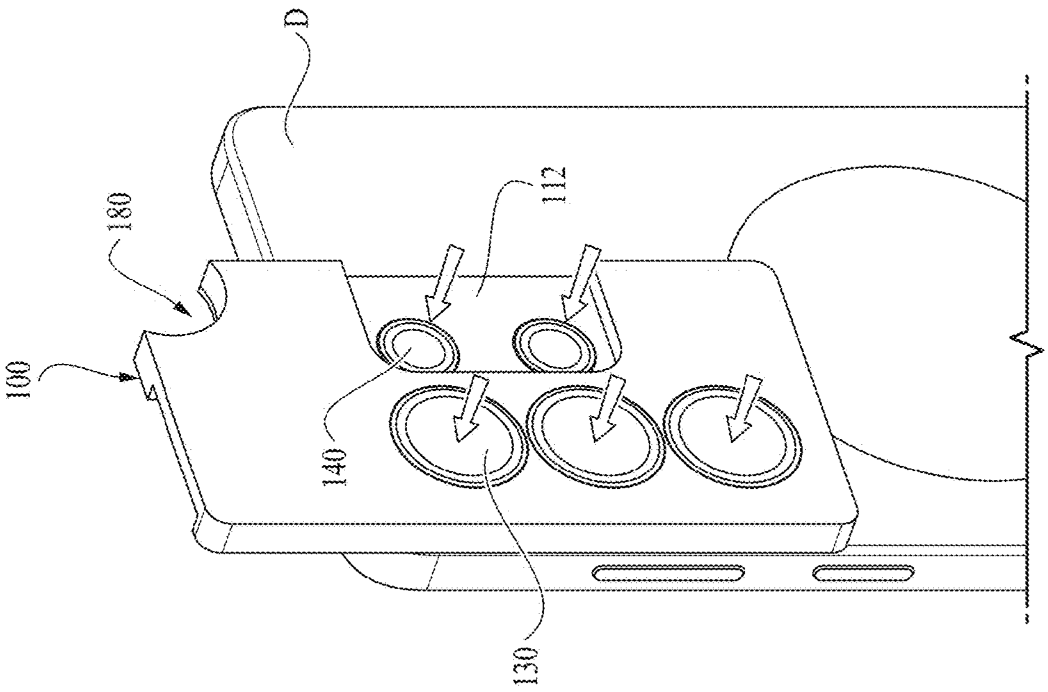

FIGS. 8A and 8B depict an example installation sequence of the apparatus 100 over the primary lens array PL and the secondary lens array SL of the mobile device D according to one or more embodiments of the present disclosure. First, a user removes the back film 160 by gripping the removal tab 161 and peeling the back film 160 away from and off of the back face 182 of the carrier card 120 to expose the center film 162 and the backs of the lens protectors 140. Next, the user removes the center film 162 by gripping a removal tab 163 and peeling the center film 162 away from the second recessed section 192 to expose the backs of the lens protectors 130.

The larger surface area $SA_F$ of adhesive contact between the front film 150 and the front surface of the lens protectors 130 relative to the smaller surface area $SA_B$ of contact between the center film 162 and the back surface of the lens protectors 130 allows the center film 163 to be removed without displacing the lens protectors 130 from the retention chambers 122 of the carrier card 120. The larger surface area $SA_F$ of adhesive contact between the secondary film 156 and the front surface of the lens protectors 140 relative to the smaller surface area $SA_B$ of contact between the back film 160 and the back surface of the lens protectors 140 allows the back film 160 to be removed without displacing the lens protectors 140 from the retention chambers 124 of the carrier card 120.

Optionally, the user may clean the lenses of the primary lens array PL and the secondary lens array SL as desired to remove fingerprints or dust prior to installation of the lens protectors 130 and 140. Then, the user positions the carrier card 120 with one or more of the lens protectors 130 and 140 aligned in position over one or more corresponding lenses of the primary lens array PL and the secondary lens array SL or other protected features of the device D. In example embodiments including a plurality of lens protectors in an array corresponding to an array of lenses, the plurality of lens protectors are aligned in arrayed position over the plurality of lenses, with each lens protector positioned over a respective corresponding lens.

The second recessed section 192 may be cooperative with the SS of the device D for installing the one or more lens protectors 130 onto the primary lens array PL of the device D. The recessed section 192 may accommodate the protrusion of the SS relative to the BS of the device D. Once the second recessed section 192 is aligned and cooperatively positioned with respect to the SS of the device D, the one or more chambers 124 may be cooperatively aligned with the secondary lens array SL of the device D. The first recessed section 112 may facilitate positioning and installation of the lens protectors 140 onto the secondary lens array SL of the device D in tandem with the second recessed section 192 facilitating positioning and installation of the one or more lens protectors 130 onto the primary lens array PL of the device D. The first recessed section 112 and the second recessed section 192 can enable the one or more lens protectors 130 to be retained at a first depth position relative to the carrier card body 120 in one or more corresponding first depth chambers, and the one or more lens protectors 140 to be retained at a different second depth position relative to the carrier card body 120 in one or more corresponding second depth chambers. The first depth position may be offset from the second depth position by an offset depth corresponding to the difference between the respective depths relative to the outer surface of the carrier card body 120.

In alternate embodiments, a single lens protector can be installed onto a single lens, and/or multiple individual lens protectors can be separately installed onto multiple lenses of a device. The user then pushes each of the lens protectors 130 and 140 onto its corresponding lens of the primary lens array PL and the secondary lens array SL, for example with finger pressure as indicated by the direction arrow in FIG. 8A.

The carrier card 120 is then removed by retracting it away from the device D, as shown in FIG. 8B, detaching the lens protectors 130 and 140 from the carrier card and leaving the lens protectors engaged in place in a protective configuration on the lenses of the primary lens array PL and the secondary lens array SL of the device D. In example embodiments, the annular ring or collars of the lens protectors 130 and 140 fit sufficiently closely over and onto the lenses of the primary lens array PL and the secondary lens array SL, such that a frictional engagement between the interior surfaces of the lens protector collars and the exterior surfaces of the lenses are sufficient to retain the corresponding lens protectors in place on the lenses as the carrier card 120 is removed, and during extended use of the device D with the lens protector installed.

In other embodiments, a releasable adhesive is optionally provided between the lens protector collars and the lenses to retain the lens protectors in the installed protective configuration during extended use. The frictional and/or adhesive engagement between the lens protectors 130 and 140 and the lenses of the primary lens array PL and the secondary lens array SL in the installed protective configuration is preferably sufficiently stronger than the bond between the lens protectors 130 and 140 and the front film 150 and the secondary film 156 at the front surface area $SA_F$, so that removal of the carrier card 120 detaches the lens protectors 130 and 140 from the carrier card 120 and from the front film 150 and the secondary film 156 without causing disengagement or repositioning of the lens protectors 130 and 140 from the lenses of the primary lens array PL and the secondary lens array SL.

Alternatively or additionally, the user's finger pressure as indicated in the step of FIG. 8A assists in detachment of the lens protector 130 and 140 from the front film 150 and the secondary film 156 and positioning and engagement of the lens protectors 130 and 140 onto the lenses of the primary lens array PL and the secondary lens array SL. Once installed, the lens protectors 130 and 140 protect the lenses of the primary lens array PL and the secondary lens array SL from scratches, chipping or other damage during normal use of the device. In some example embodiments, the device D may have greater than or fewer than three lenses (e.g., for the primary lens array PL) and greater than or fewer than two lenses (e.g., for the secondary lens array SL) that are identical and equally spaced and/or symmetrically arranged, such that the consumer can apply or install the lens protectors 130 in two or more mirrored or different orientations of the lens protector apparatus 100, for example top-to-bottom or bottom-to-top, or left-to-right or right-to-left. In other example embodiments, the lenses of the device D may not be identical or equally spaced or symmetrical, and the protector apparatus 100 may optionally have an alignment or indexing feature such as a directional arrow, text instructions, and/or other symbol or image, to assist the user in installation of the lens protectors 130 and 140 in the correct orientation and ensure that the protectors are installed in a configuration or orientation that matches the device camera lens configuration or orientation.

Figure 9A:
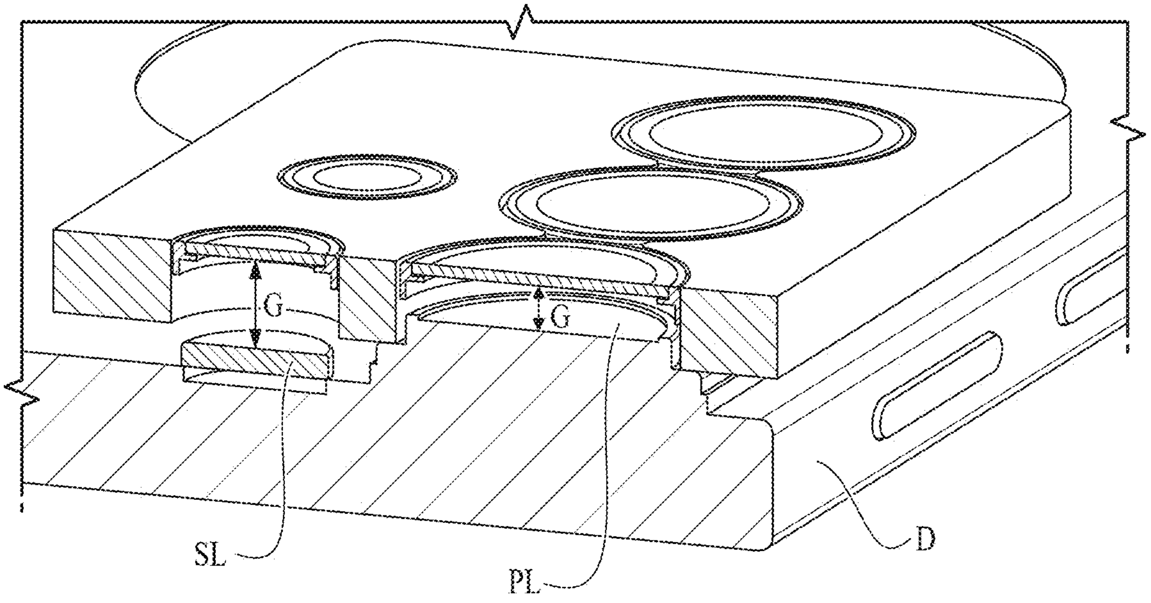
FIG. 9A depicts a sectional view of another lens protector applicator and apparatus applied over the primary lens array PL and the secondary lens array SL of the mobile device D according to one or more embodiments of the present disclosure.
Figure 9B:
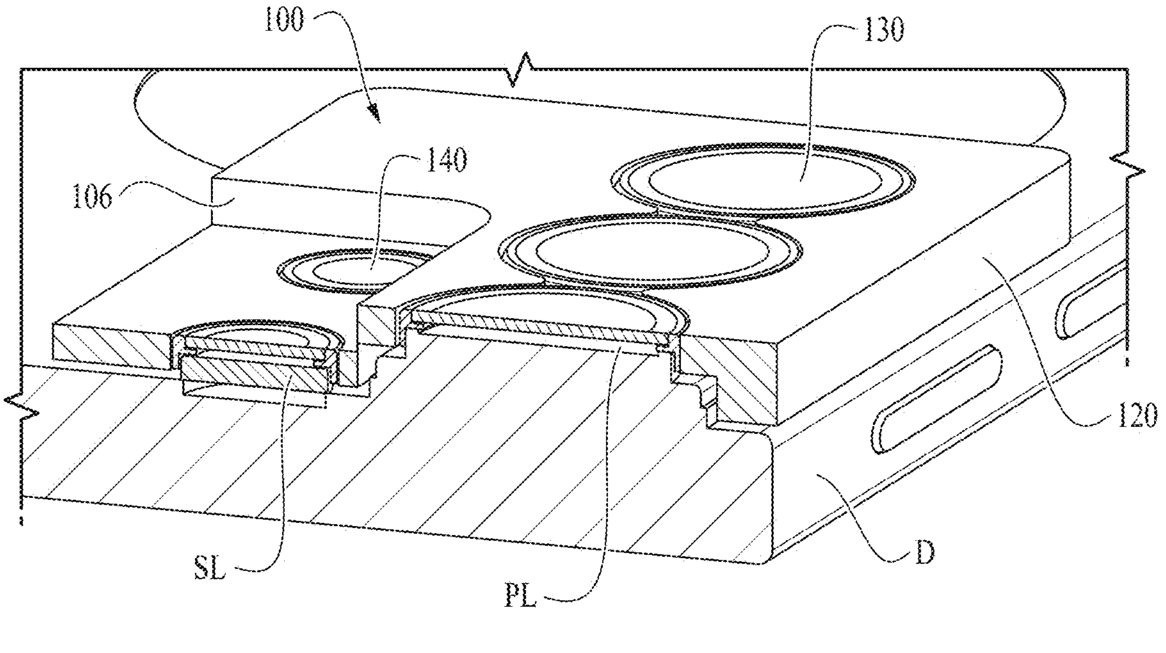
FIG. 9B depicts a sectional view of the apparatus shown in FIG. 6A applied over the primary lens array PL and the secondary lens array SL of the mobile device D according to one or more embodiments of the present disclosure.

FIG. 9A depicts a sectional view of another lens protector applicator and apparatus applied over the primary lens array PL and the secondary lens array SL of the mobile device D, and FIG. 9B depicts a sectional view of the apparatus 100 applied over the primary lens array PL and the secondary lens array SL of the mobile device D, according to one or more embodiments of the present disclosure. FIG. 9A is provided for comparison purposes. With application of the apparatus shown in FIG. 9A, significant gaps "G" may be present between the lens protectors of the apparatus and the lenses of the secondary lens array SL and the primary lens array PL, which can prevent a user from aligning and pressing the lens. However, with application of the apparatus 100 shown in FIG. 9B, the gaps G are significantly reduced or eliminated, allowing a user to align and press the lens protectors 130 and 140 over the lenses of the secondary lens array SL and the primary lens array PL for proper installation. Without the recessed sections 112 and 192 (FIGS. 6A and 6B) for the apparatus 100, which enable the lens protectors 130 and 140 to be retained at varying depths within the different chambers 122 and 124, proper installation of lens protectors onto the lenses of the secondary lens array SL and the primary lens array PL would be very difficult or unmanageable.

While the invention has been described with reference to example embodiments, it will be understood by those skilled in the art that a variety of modifications, additions and deletions are within the scope of the invention, as defined by the following claims.

What is claimed is:

1. An apparatus for installation and removal of a plurality of lens protectors to and from a plurality of lenses, the apparatus comprising:

a carrier configured to releasably retain a plurality of lens protectors, the plurality of lens protectors comprising one or more first lens protectors and one or more second lens protectors in delivery positions for installation onto a plurality of lenses of a device; and a removal tool comprising a portion of the carrier and configured for removal of the one or more first lens protectors or the one or more second lens protectors from one or more lenses of the plurality of lenses of the device, wherein the one or more first lens protectors and the one or more second lens protectors are positioned in different chambers in the carrier;

wherein the different chambers comprise one or more first chambers for retaining the one or more first lens protectors therein and one or more second chambers for retaining the one or more second lens protectors therein, the one or more first chambers being offset from the one or more second chambers by an offset depth in the carrier;

wherein the one or more first chambers are located in a first recessed section in the carrier and the one or more second chambers are located in a second recessed section in the carrier; and further comprising at least one film layer applied to the carrier and retaining the plurality of lens protectors in the delivery position within the different chambers; and wherein the at least one film layer comprises:

a front film layer applied to a front face of the carrier;

a secondary film layer applied to the first recessed section of the carrier;

a center film layer applied to the second recessed section of the carrier; and a back film layer applied to a back face of the carrier, wherein the one or more first lens protectors are retained in the delivery position within the one or more first chambers and between the secondary film layer and the back film layer.

2. The apparatus of claim 1, wherein the back film layer is removably attached to the carrier.

3. The apparatus of claim 1, wherein the back film layer comprises a removal tab extending beyond a side of the carrier to assist in removal of the back film layer from the carrier.

4. The apparatus of claim 1, wherein the one or more second lens protectors are retained in the delivery position within the one or more second chambers and between the front film layer and the center film layer.

5. The apparatus of claim 1, wherein the center film layer comprises a removal tab extending beyond a side of the carrier to assist in removal of the center film layer from the carrier.

6. The apparatus of claim 1, wherein a front surface area of attachment is defined at a contact area between the plurality of lens protectors and the front film layer, and wherein a back surface area of attachment is defined at a contact area between the plurality of lens protectors and the back film layer, and wherein the front surface area of attachment is substantially greater than the back surface area of attachment.

7. The apparatus of claim 6, wherein a frictional and/or adhesive engagement is formed between the plurality of lens protectors and the plurality of lenses of the device upon installation, and wherein a frictional and/or adhesive engagement force between the plurality of lens protectors and the plurality of lenses of the device is substantially greater than a detachment force required to detach the plurality of lens protectors from the carrier and from the front film layer at the front surface area of attachment.

8. The apparatus of claim 1, wherein the plurality of lenses of the device comprise a first group of equally spaced lenses and a second group of equally spaced lenses offset from the first group of equally spaced lenses by an offset depth in the carrier, and wherein the one or more first lens protectors are installed over the first group of equally spaced lenses and the one or more second lens protectors are installed over the second group of equally spaced lenses.

9. The apparatus of claim 1, wherein the removal tool comprises a protrusion extending from the carrier and configured for engagement between the plurality of lens protectors and the device during removal.

10. The apparatus of claim 9, wherein the protrusion of the removal tool comprises an arcuately curved flange.

11. The apparatus of claim 1, wherein the carrier comprises a generally rectangular panel having four sides and four corner portions at intersections of the four sides, and wherein the removal tool is located at one of the four corner portions.

12. The apparatus of claim 1, wherein the carrier comprises a generally rectangular panel having four sides and four corner portions at intersections of the four sides, and wherein the removal tool is located at one of the four corner portions.

13. A multi-depth lens protector apparatus for installation and removal of a plurality of lens protectors to and from a plurality of lenses, the multi-depth lens protector apparatus comprising:

a carrier comprising:

a body having a front face and a back face; and one or more first chambers and one or more second chambers;

a first lens protector releasably retained at a first depth position relative to the carrier in the one or more first chambers; and a second lens protector releasably retained at a different second depth position relative to the carrier in the one or more second chambers;

wherein the one or more first chambers are located in a first recessed section in the carrier, and wherein the one or more second chambers are located in a second recessed section in the carrier; and wherein the first recessed section is recessed relative to the front face of the carrier, and wherein the second recessed section is recessed relative to the back face of the carrier.

14. The multi-depth lens protector apparatus of claim 13, wherein the second recessed section is cooperative with a secondary surface of a device for installing the second lens protector onto a lens protruding from the secondary surface, the secondary surface protruding relative to a base surface of the device.

15. The multi-depth lens protector apparatus of claim 14, wherein the first recessed section facilitates positioning and installation of the first lens protector onto a lens protruding relative to the base surface of the device.

16. The multi-depth lens protector apparatus of claim 13, wherein the body of the carrier is generally rectangular, having four sides and four corner portions at intersections of the four sides; and further comprising a removal tool configured for removal of the first lens protector or the second lens protector from a first lens or a second lens of a device, the removal tool located at one of the four corner portions.

17. A multi-depth lens protector apparatus for installation and removal of a plurality of lens protectors to and from a plurality of lenses, the multi-depth lens protector apparatus comprising:

a carrier comprising:

a body having a front face and a back face; and one or more first chambers and one or more second chambers;

a first lens protector releasably retained at a first depth position relative to the carrier in the one or more first chambers; and a second lens protector releasably retained at a different second depth position relative to the carrier in the one or more second chambers; and further comprising:

a front film layer applied over the front face of the carrier;

a secondary film layer applied to a first recessed section of the carrier;

a center film layer applied to a second recessed section of the carrier; and a back film layer applied over the back face of the carrier and removable therefrom.

18. The multi-depth lens protector apparatus of claim 17, wherein removal of the center film layer exposes a rear portion of the second lens protector for application to a lens of a device.

19. The multi-depth lens protector apparatus of claim 17, wherein the body of the carrier is generally rectangular, having four sides and four corner portions at intersections of the four sides; and further comprising a removal tool configured for removal of the first lens protector or the second lens protector from a first lens or a second lens of a device, the removal tool located at one of the four corner portions.

* * * * *